UNITED STATES PATENT OFFICE.

SELVIN E. PADDOCK, OF DELAWARE, OHIO.

IMPROVEMENT IN MEDICAL COMPOUNDS.

Specification forming part of Letters Patent No. 142,408, dated September 2, 1873; application filed August 6, 1873.

*To all whom it may concern:*

Be it known that I, S. E. PADDOCK, of Delaware, in the county of Delaware and State of Ohio, have invented certain new and useful Improvements in Medical Compound; and I do hereby declare that the following is a full, clear, and exact description thereof.

My medical compound is composed of burdock-root and mandrake-root steeped in alcohol, as follows: I take twenty parts of burdock-root and one part of mandrake-root, which are steeped in alcohol, reduced one-fourth with water, sufficient to cover the roots being used. This is allowed to stand for fourteen days, when the liquor is drawn off and is ready for use. All the roots are thoroughly pressed when taken out of the liquor, so as to get the entire strength.

This compound is an excellent medicine generally for purifying the blood.

I do not confine myself to the exact proportions of the ingredients used, as they may perhaps be varied according to the nature of the case.

What I claim is—

The medical compound herein described, composed of the ingredients in substantially the proportions and for the purposes set forth.

In testimony that I claim the foregoing as my own I affix my signature in presence of two witnesses.

S. E. PADDOCK.

Witnesses:
T. E. POWELL,
FRANK M. MARRIOTT.